United States Patent
Suematsu et al.

(10) Patent No.: US 8,652,699 B2
(45) Date of Patent: Feb. 18, 2014

(54) FUEL CELL SYSTEM

(75) Inventors: Keigo Suematsu, Toyota (JP); Tomotaka Ishikawa, Aichi-gun (JP); Yuichi Sakajo, Kariya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/503,241

(22) PCT Filed: Oct. 23, 2009

(86) PCT No.: PCT/JP2009/068229
§ 371 (c)(1),
(2), (4) Date: Apr. 20, 2012

(87) PCT Pub. No.: WO2011/048690
PCT Pub. Date: Apr. 28, 2011

(65) Prior Publication Data
US 2012/0214079 A1    Aug. 23, 2012

(51) Int. Cl.
| | |
|---|---|
| *H01M 8/04* | (2006.01) |
| *H01M 2/12* | (2006.01) |
| *H01M 2/36* | (2006.01) |
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G06F 19/00* | (2011.01) |
| *G06G 7/70* | (2006.01) |
| *G06F 17/10* | (2006.01) |
| *G06G 7/48* | (2006.01) |
| *G01R 15/00* | (2006.01) |
| *G01C 9/00* | (2006.01) |
| *G01C 17/00* | (2006.01) |
| *G01C 19/00* | (2013.01) |

(52) U.S. Cl.
USPC ............ 429/444; 429/53; 429/72; 429/82; 429/400; 701/22; 701/36; 701/99; 701/124; 702/57; 702/150; 702/154

(58) Field of Classification Search
USPC ............ 429/400, 444, 53, 72, 82; 701/22, 36, 701/99, 124; 702/57, 150, 154
See application file for complete search history.

(56) References Cited

FOREIGN PATENT DOCUMENTS

| JP | 2005-228634 A | 8/2005 | |
| JP | 2006-114261 | * 4/2006 | .............. H01M 8/06 |

(Continued)

OTHER PUBLICATIONS

International Search Report mailed Jan. 12, 2010 of PCT/JP2009/068229.

*Primary Examiner* — Patrick Ryan
*Assistant Examiner* — Aaron Greso
(74) *Attorney, Agent, or Firm* — Kenyon & Kenyon LLP (57) ABSTRACT

This fuel cell system is for suppressing a backflow of water from an exhaust pipe outlet that discharges a reactant-off gas, without decreasing the performance and fuel consumption of a fuel cell, the exhaust pipe being configured to switch between a main discharge pipe and a sub discharge pipe by a switching means to discharge the reactant-off gas. The sub discharge pipe includes a rising gradient portion formed to incline upwards above a gradient of the main discharge pipe and a falling gradient portion formed to incline downwards at the downstream of the rising gradient portion. The switching valve switches to allow the reactant-off gas to be discharged from the main discharge pipe if an amount of reactant-off gas to be discharged is equal to or above a threshold value of an amount of discharge, and allow the reactant-off gas to be discharged from the sub discharge pipe if the amount of reactant-off gas to be discharged is below the threshold value of the amount of discharge.

3 Claims, 5 Drawing Sheets

(56) References Cited

FOREIGN PATENT DOCUMENTS

| JP | 2007-053015 A | 3/2007 |
| JP | 2007-317493 A | 12/2007 |
| JP | 2008-053112 A | 3/2008 |
| JP | 2008-112647 A | 5/2008 |
| JP | 2008-112679 A | 5/2008 |
| JP | 2008-186701 A | 8/2008 |

* cited by examiner

FUEL CELL SYSTEM

This is a 371 national phase application of PCT/JP2009/068229 filed 23 Oct. 2009, the contents of which are incorporated herein by reference.

TECHNICAL FIELD

The present invention relates to a fuel cell system.

BACKGROUND ART

In a fuel cell system, an oxidant gas (e.g., air) and a fuel gas (e.g., hydrogen) are supplied to a fuel cell, and electric power is generated through an electrochemical reaction of these reactant gases. Water that is generated in the fuel cell caused by this electrochemical reaction is discharged to the outside through an exhaust system of the fuel cell while the fuel cell system is in operation. However, when the outside-air temperature is low, the moisture inside the exhaust system freezes, and it may not be possible to continue the operation or restart the operation once it has been stopped. In order to solve such a problem, in the Patent Document 1 below, two exhaust systems with paths of small cross-sectional areas are provided such that it is possible to continue or restart the operation by ensuring an exhaust path in one of the exhaust systems even if the other one of the exhaust systems is frozen. However, since the gas is always exhausted from two systems, there is a problem in that the amount of electric power generation requested to the fuel cell cannot be ensured depending on the state of the fuel cell system.

In order to solve this problem, in the Patent Document 2 below, a plurality of exhaust systems that allows the reactant-off gas discharged from the fuel cell to flow is provided, as well as a control unit that selects, from a plurality of exhaust systems, the exhaust system that allows the reactant-off gas to flow depending on the state of the system is also provided.

PRIOR ART REFERENCES

Patent Documents

Patent Document 1: Japanese laid-open patent publication No. 2005-228634
Patent Document 2: Japanese laid-open patent publication No. 2008-53112

SUMMARY OF THE INVENTION

Problem to be Solved by the Invention

When a fuel cell system is mounted in a vehicle, the fuel cell would be positioned under-floor, and an exhaust pipe of a reactant-off gas that serves to discharge the water generated in the fuel cell caused by the electrochemical reaction would also be positioned under-floor. If the fuel cell and the exhaust pipe are mounted at low positions in such a way, it is necessary to ensure that the exhaust pipe and its outlet are at a height of a certain degree in order to clear the submergence level required in a vehicle. Thus, it is difficult to discharge the water generated in the fuel cell only by a gradient of the exhaust pipe. Additionally, if the submergence level required in the vehicle becomes higher, with such under-floor position structure, it would be difficult to clear the submergence level only by drainage due to gravity. Therefore, in order to discharge the water that is pooled in the exhaust pipe due to discharge from the fuel cell side or backflow from the outside, the delivery pressure of an air compressor that supplies the oxidant gas to the fuel cell may be increased to increase the amount of reactant-off gas to be discharged.

However, if it is difficult to increase the delivery pressure of the air compressor and increase the amount of reactant-off gas to be discharged such as during the intermittent operation of the fuel cell, the water may flow back from the outlet of the exhaust pipe. If the delivery pressure of the air compressor is forced to be increased in such a situation, an excess amount of oxidant gas would be supplied to the fuel cell, the fuel thereby drying up, causing negative effects such as decreasing the performance of the fuel cell and deteriorating fuel consumption.

The present invention has been made in light of such problems, and its object is to provide a fuel cell system that is capable of suppressing the backflow of the water from the exhaust pipe outlet that exhausts the reactant-off gas, without decreasing the performance and fuel consumption of the fuel cell.

Means for Solving the Problem

In order to solve the problem described above, a fuel cell system according to the present invention comprises: a fuel cell that is supplied with a reactant gas and generates electric power through an electrochemical reaction; and an exhaust pipe that discharges a reactant-off gas discharged from the fuel cell, wherein the exhaust pipe is configured to switch between a first exhaust pipe and a second exhaust pipe by a switching means to discharge the reactant-off gas, wherein the second exhaust pipe includes a rising gradient portion formed to incline upwards above a gradient of the first exhaust pipe and a falling gradient portion formed to incline downwards at a downstream of the rising gradient portion, wherein the switching means switches to allow the reactant-off gas to be discharged from the first exhaust pipe if an amount of reactant-off gas to be discharged is equal to or above a threshold value of an amount of discharge, and allow the reactant-off gas to be discharged from the second exhaust pipe if the amount of reactant-off gas to be discharged is below the threshold value of the amount of discharge.

According to the present invention, the exhaust pipe includes a first exhaust pipe and a second exhaust pipe branching from each other, and the first exhaust pipe and the second exhaust pipe can be switched by a switching means to selectively flow the reactant-off gas, thereby enabling the reactant-off gas to flow in the more suitable pipe depending on the amount of reactant-off gas to be discharged. The second exhaust pipe includes a rising gradient portion formed to incline upwards above the gradient of the first exhaust pipe and a falling gradient portion formed to incline downwards at the downstream of the rising gradient portion, thereby the water that tries to flow back from the outlet side cannot flow into the fuel cell side unless the water climbs up the falling gradient portion, and so the second exhaust pipe has a structure with more resistance against the backflow of the water than the first exhaust pipe. In the present invention, if the amount of reactant-off gas to be discharged is below the threshold value of the amount of discharge, the exhaust pipes are switched such that the first exhaust pipe is closed and the reactant-off gas is discharged from the second exhaust pipe, thereby allowing the backflow of the water to the fuel cell side to be suppressed even if the water cannot be pushed back by the reactant-off gas.

The fuel cell system according to the present invention comprises an inclination angle acquiring means for acquiring an inclination angle in a direction which the exhaust pipe of a vehicle equipped with the fuel cell system extends, and the switching means, preferably, adjusts the threshold value of the amount of discharge by the inclination angle acquired by the inclination angle acquiring means and switches between the first exhaust pipe and the second exhaust pipe depending on the threshold value of the amount of discharge after the adjustment.

For example, when a vehicle equipped with this fuel cell system leans forward, the outlet of the exhaust pipe would be relatively high with respect to the fuel cell, thereby the amount of reactant-off gas to be discharged for pushing the water from the exhaust pipe would be relatively large. Therefore, the fuel cell system comprises an inclination angle acquiring means for acquiring an inclination angle in a direction which the exhaust pipe of a vehicle equipped with the fuel cell system extends, wherein the inclination angle acquiring means adjusts the threshold value of the amount of discharge by the acquired inclination angle, thereby switching between the first exhaust pipe and the second exhaust pipe in a more suitable manner.

In a fuel cell system according to the present invention, if an amount of water that is pooled in the exhaust pipe is equal to or above a threshold value of the amount of water, preferably, the switching means switches so as to discharge the reactant-off gas from the first exhaust pipe.

In the present invention, since the second exhaust pipe is provided with a rising gradient portion, it is assumed that water may be pooled from the switching means towards the rising gradient portion. In a preferred embodiment of the present invention, if the amount of water that is pooled in the exhaust pipe is equal to or above the threshold value of the amount of water, the exhaust pipe can be switched so as to discharge the reactant-off gas from the first exhaust pipe, thereby facilitating the discharge of the pooled water from the first exhaust pipe.

Effect of the Invention

According to the present invention, a fuel cell system that is capable of suppressing the backflow of the water from the exhaust pipe outlet that discharges the reactant-off gas, without decreasing the performance and fuel consumption of the fuel cell, is provided.

MODE FOR CARRYING OUT THE INVENTION

An embodiment of the present invention will be described below with reference to the attached drawings. In order to easily understand the descriptions, corresponding reference numerals are assigned to corresponding components wherever possible in each drawing and any redundant descriptions will be omitted.

Figure 1:
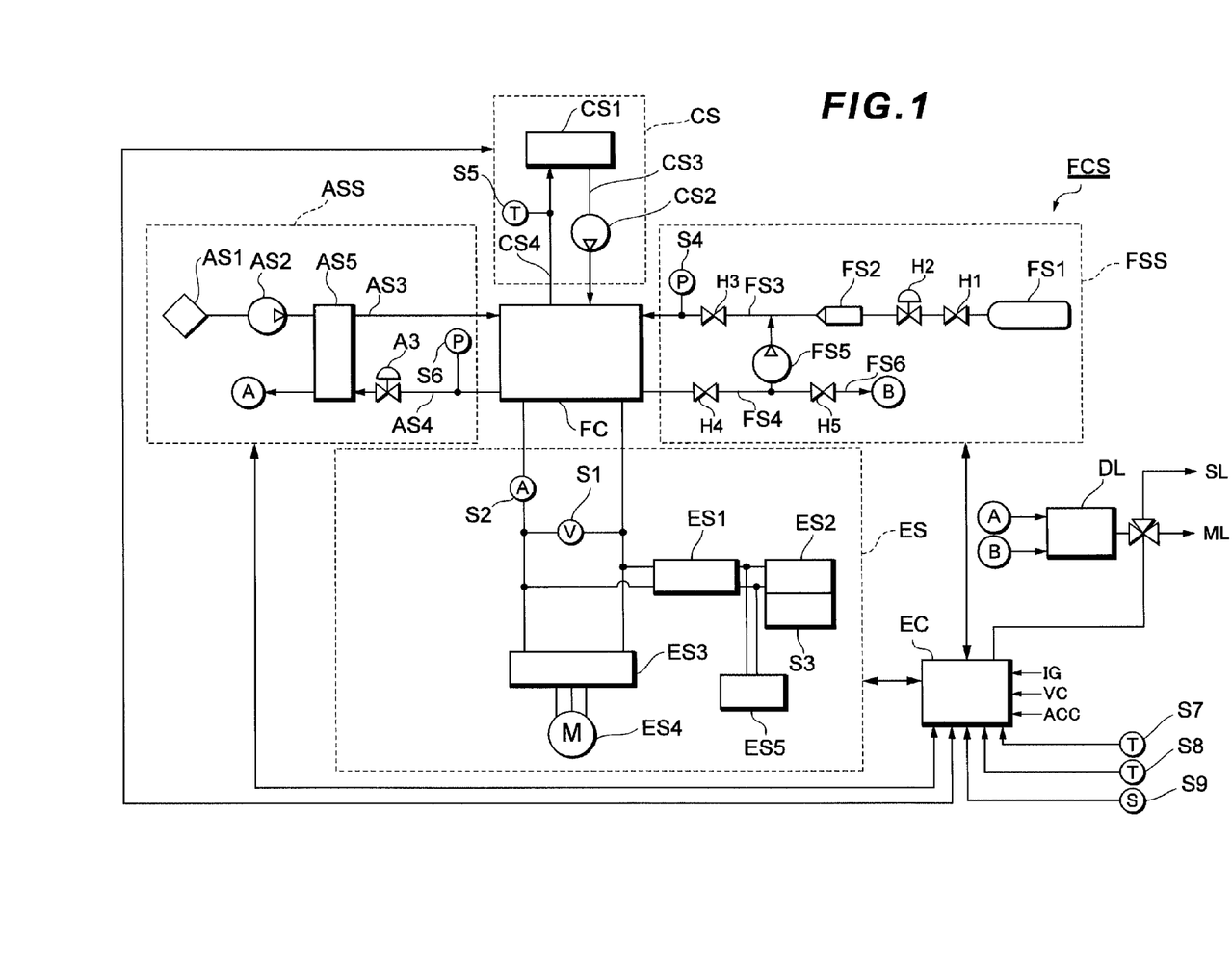
FIG. 1 is a diagram showing a configuration of a fuel cell system mounted in a fuel cell vehicle, which is an embodiment of the present invention.

Firstly, a fuel cell system FCS mounted in a fuel cell vehicle which is the embodiment of the present invention will be described with reference to FIG. 1. FIG. 1 is a diagram showing a system configuration of a fuel cell system FCS which serves as an on-vehicle power source system of a fuel cell vehicle. The fuel cell system FCS can be mounted in vehicles such as fuel cell hybrid vehicles (FCHV), electric vehicles and hybrid vehicles.

The fuel cell system FCS comprises a fuel cell FC, an oxidant gas supply system ASS, a fuel gas supply system FSS, an electric power system ES, a cooling system CS and a controller EC. The fuel cell FC is supplied with a reactant gas (fuel gas, oxidant gas) to generate electric power. The oxidant gas supply system ASS is a system for supplying air as an oxidant gas to the fuel cell FC. The fuel gas supply system FSS is a system for supplying hydrogen gas as a fuel gas to the fuel cell FC. The electric power system ES is a system for controlling charge/discharge of the electric power. The cooling system CS is a system for cooling the fuel cell FC. The controller EC is a controller that centrally controls the entire fuel cell system FCS.

The fuel cell FC is configured as a solid polymer electrolyte cell stack in which a plurality of cells (a single battery comprising an anode, cathode and electrolyte (generator)) is stacked in series. The fuel cell FC is provided with a temperature sensor that is not shown in the diagram. In the fuel cell FC, in a normal operation, an oxidization reaction represented as the below formula (1) occurs at the anode, and a reduction reaction represented as the below formula (2) occurs at the cathode. An electromotive reaction represented as the below formula (3) occurs in the entire fuel FC.

$$H_2 \rightarrow 2H^+ + 2e^- \qquad (1)$$

$$(\tfrac{1}{2})O_2 + 2H^+ + 2e^- \rightarrow H_2O \qquad (2)$$

$$H_2 + (\tfrac{1}{2})O_2 \rightarrow H_2O \qquad (3)$$

The oxidant gas supply system ASS includes an oxidant gas flow path AS3 and an oxidant-off gas flow path AS4. The oxidant gas flow path AS3 is a flow path in which the oxidant gas supplied to the cathode of the fuel cell FC flows. The oxidant-off gas flow path AS4 is a flow path in which the oxidant-off gas discharged from the fuel cell FC flows.

The oxidant gas flow path AS3 is provided with an air compressor AS2 and a humidifier AS5. The air compressor AS2 is a compressor for introducing oxidant gas from the atmosphere through a filter AS1. The humidifier AS5 is a humidifier for humidifying the oxidant gas that is compressed by the air compressor AS2.

The oxidant-off gas flow path AS4 is provided with a pressure sensor S6, a backpressure regulating valve A3 and a humidifier AS5. The backpressure regulating valve A3 is a valve for regulating the supply pressure of the oxidant gas. The humidifier AS5 is provided for exchanging water between the oxidant gas (dry gas) and the oxidant-off gas (wet gas). The oxidant-off gas that is discharged via the oxidant-off gas flow path AS4 is mixed with fuel-off gas that flows through the exhaust/drain flow path FS6. Then, the fuel-off gas is diluted through a diluter DL and discharged to the outside via the main discharge pipe ML (first exhaust pipe) or the sub discharge pipe SL (second exhaust pipe).

The fuel gas supply system FSS includes a fuel gas supply source FS1, a fuel gas flow path FS3, a circulation flow path FS4, a circulation pump FS5 and an exhaust/drain flow path FS6. The fuel gas flow path FS3 is a flow path for the fuel gas supplied from the fuel gas supply source FS1 to the anode of the fuel cell FC to flow. The circulation flow path F4 is a flow path for returning a fuel-off gas discharged from the fuel cell FC to the fuel gas flow path FS3. The circulation pump FS5 is a pump for pumping the fuel-off gas in the circulation flow path FS4 to the fuel gas flow path FS3. The exhaust/drain flow path FS6 is a flow path that is connected to the circulation flow path FS4 in such a manner branching from the circulation flow path FS4.

The fuel gas supply source FS1 is constituted from, for example, a high-pressure hydrogen tank and hydrogen-absorbing alloy, and the fuel gas supply source FS1 being configured to store hydrogen gas at high-pressure (e.g., 35 MPA to 70 MPA) therein. When a cutoff valve H1 is opened, the fuel gas flows out from the fuel gas supply source FS1 into the fuel gas flow path FS3. The fuel gas is decompressed to, for example, 200 kPa by a regulator H2 and injector FS2, and supplied to the fuel cell FC.

The fuel gas flow path FS3 is provided with a cutoff valve H1, a regulator H2, an injector FS2, a cutoff valve H3 and a pressure sensor S4. The cutoff valve H1 is a valve for shutting off or allowing the supply of fuel gas from the fuel gas supply source FS1. The regulator H2 regulates the pressure of the fuel gas. The injector FS2 controls the amount of supply of the fuel gas to the fuel cell FC. The cutoff valve H3 is a valve for shutting off the supply of the fuel gas to the fuel cell FC.

The regulator H2 is a device for regulating the pressure at its upstream side (primary pressure) to a preset secondary pressure, and it is constituted by, for example, a mechanical pressure-reducing valve which reduces the primary pressure. The mechanical pressure-reducing valve has a configuration in which: a casing having a backpressure chamber and a pressure regulating chamber separated by a diaphragm is provided; and, with the backpressure in the backpressure chamber, the primary pressure is reduced to a predetermined pressure in the pressure regulating chamber, thereby obtaining the secondary pressure. The regulator H2 is arranged upstream of the injector FS2, thereby the pressure at the upstream of the injector FS2 can be reduced effectively.

The injector FS2 is an electromagnetic drive type on-off valve having a configuration in which a valve body is directly driven with an electromagnetic driving force with a predetermined drive period so as to be separated from a valve seat, thereby regulating the gas flow rate and gas pressure. The injector FS2 comprises a valve seat having an injection hole through which gas fuel such as a fuel gas is injected, a nozzle body for supplying and guiding the gas fuel to the injection hole; and a valve body which is held to be contained in a movable manner in an axial direction (gas flow direction) with respect to the nozzle body and which opens/closes the injection hole.

The valve body of the injector FS2 is configured to be driven by a solenoid, which is an electromagnetic driving device, and a gas injection period and a gas injection time of the injector FS2 can be controlled by control signals output from the controller EC control. In the injector FS2, in order to supply gas at a flow rate required for the downstream, at least one of the opening area (degree of opening) and the open time of the valve body provided in a gas flow path of the injector FS2 is changed, thereby regulating the flow rate (or hydrogen mol concentration) of the gas supplied to the downstream.

The circulation flow path FS4 is provided with a cutoff valve H4, and an exhaust/drain flow path FS6 is connected to the circulation flow path FS4. The exhaust/drain flow path FS6 is provided with an exhaust/drain valve H5. The exhaust/drain valve H5 is a valve for discharging to the outside the fuel-off gas containing impurities and moisture in the circulation flow path FS4 by operating in accordance with the commands from the controller EC. By opening the exhaust/drain valve H5, the concentration of the impurities contained in the fuel-off gas in the circulation flow path FS4 decreases, which enables the hydrogen concentration in the fuel-off gas circulating in a circulation system to increase.

The fuel-off gas discharged through the exhaust/drain valve H5 is mixed with the oxidant-off gas flowing in the oxidant-off gas flow path AS4. Then, the fuel-off gas is diluted with a diluter DL and discharged to the outside via the main discharge pipe ML or the sub discharge pipe SL. The circulation pump FS5 circulates and supplies the fuel-off gas in the circulation system to the fuel cell FC by a motor drive.

The electric power system ES includes a DC/DC converter ES1, a battery ES2, a traction inverter ES3, a traction motor ES4 and auxiliary devices ES5. The fuel cell system FCS is configured as a parallel hybrid system in which the DC/DC converter ES1 and the traction inverter ES3 are connected in parallel with the fuel cell FC.

The DC/DC converter ES1 has a function of increasing a direct-current voltage supplied from the battery ES2 and outputting the resultant direct-current voltage to the traction inverter ES3, and a function of decreasing the direct-current power generated by the fuel cell FC or the regenerative power collected by the traction motor ES4 via regenerative braking and charging the battery with the resultant power. These functions of the DC/DC converter ES1 control the charge and discharge of the battery ES2. The voltage conversion control by the DC/DC converter ES1 controls the operation point (output terminal voltage and output current) of the fuel cell FC. The fuel cell FC is provided with a voltage sensor S1 and a current sensor S2. The voltage sensor S1 is a sensor for detecting the output terminal voltage of the fuel cell FC. The current sensor S2 is a sensor for detecting the output current of the fuel cell FC.

The battery ES2 functions as a storage source of surplus power, a storage source of regenerative energy during regenerative braking, and an energy buffer during a load variation as a result of acceleration or deceleration of a fuel cell vehicle. Preferably, examples of the battery ES2 include a secondary battery such as nickel/cadmium storage battery, a nickel/hydrogen storage battery or a lithium secondary battery. The battery ES2 is provided with an SOC sensor S3 for detecting the SOC (state of charge).

The traction inverter ES3 is, for example, a PWM inverter driven by a pulse width modulation method. In accordance with control commands from the controller EC, the traction inverter ES3 converts a direct-current voltage output from the fuel cell FC or the battery ES2 into a three-phase AC voltage, thereby controlling a rotation torque of the traction motor ES4. The traction motor ES4 is, for example, a three-phase AC motor, and constitutes the power source of the fuel cell vehicle.

The auxiliary device ES5 is a generic name for motors arranged in the respective units in the fuel cell system FCS (e.g., power sources for pumps, etc.), inverters for driving these motors, and various vehicle-mounted auxiliary devices (e.g., an air compressor, injector, cooling water circulation pump and radiator).

The cooling system CS includes a radiator CS1, a coolant pump CS2, a coolant forward path CS3 and a coolant return path CS4. The radiator CS1 discharges heat of the coolant for cooling the fuel cell FC and cools the fuel cell FC. The coolant pump CS2 is a pump for circulating the coolant between the fuel cell FC and the radiator CS1. The coolant forward path CS3 is a flow path that connects the radiator CS1 and the fuel cell FC, and the coolant forward path CS3 is provided with a coolant pump CS2. Driving the coolant pump CS2 allows the coolant to flow from the radiator CS1 to the fuel cell FC through the coolant forward path CS3. The coolant return path CS4 is a flow path that connects the fuel cell FC and the radiator CS1, and the coolant return path CS4 is provided with a water temperature sensor S5. Driving the coolant pump CS2 allows the coolant that cooled the fuel cell FC to flow back to the radiator CS1.

The controller EC (control unit) is a computer system which includes a CPU, ROM, RAM and an input/output interface, and controls the respective units of the fuel cell system FCS. For example, when an ignition signal IG output from an ignition switch is received, the controller EC starts the operation of the fuel cell system FCS. Subsequently, the controller EC obtains the requesting power of the entire fuel cell system FCS based on an acceleration-opening-degree signal ACC output from an acceleration sensor, a vehicle speed signal VC output from a vehicle speed sensor, etc. The requesting power of the entire fuel cell system FCS is a total value of vehicle driving power and the auxiliary-machine power. The controller EC is configured to be capable of receiving signals output from an FC temperature sensor S7, an outside-air temperature sensor S8 and an inclination angle sensor S9 (inclination angle acquiring means) and acquiring the respective measurement values. The FC temperature sensor S7 is a sensor for acquiring the temperature of the fuel cell FC. The outside-air temperature sensor S8 is a sensor for acquiring the temperature of the outside-air. The inclination angle sensor S9 is a sensor for acquiring the inclination angle of a vehicle equipped with the fuel cell system FCS.

The auxiliary-device power includes, e.g., power consumed by vehicle-mounted auxiliary devices (humidifier, air compressor, hydrogen pump, cooing water circulation pump, etc.), power consumed by devices necessary for vehicle driving (change gear, wheel control device, steering device, suspension device, etc.), and power consumed by devices arranged in an occupant space (air-conditioning device, illumination appliance, audio equipment, etc.).

The controller EC determines an output power distribution between the fuel cell FC and the battery ES2. The controller EC controls the oxidant gas supply system ASS and the fuel gas supply system FSS so that the amount of power generated by the fuel cell FC corresponds to the target power, and also controls the DC/DC converter ES1, thereby controlling the operation point (output terminal voltage and output current) of the fuel cell FC. Moreover, in order to obtain a target torque in accordance with an acceleration opening degree, the controller EC outputs, for example, respective AC voltage command values of a U-phase, a V-phase and a W-phase as switching commands to the traction inverter ES3, and controls the output torque and the number of rotations of the traction motor ES4. Additionally, the controller EC controls the cooling system CS to control the fuel cell FC to be at a suitable temperature. The controller EC also outputs the control signal to a switching valve SV (switching means) provided at the downstream of the diluter DL, and controls whether to discharge the off gas delivered from the diluter DL via the main discharge pipe ML or via the sub discharge pipe SL.

Figure 2:
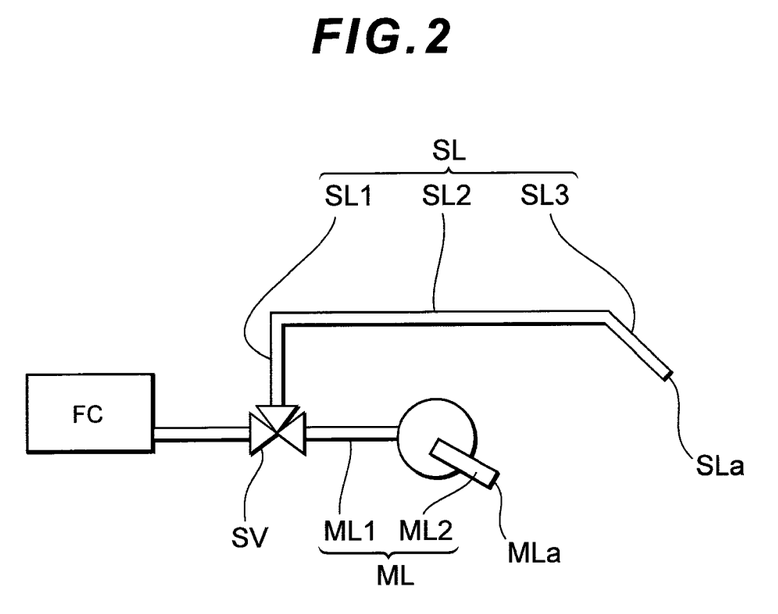
FIG. 2 is a diagram showing a configuration of a main discharge pipe and a sub discharge pipe.

Next, referring to FIG. 2, configurations of a main discharge pipe ML and a sub discharge pipe SL will be described below. FIG. 2 is a schematic diagram showing the configurations of the main discharge pipe ML and the sub discharge pipe SL of the present embodiment. As shown in FIG. 2, the off gas discharged from the fuel cell FC is configured such that the off gas is discharged from one of the main discharge pipe ML and the sub discharge pipe SL by using a switching valve SV.

The main discharge pipe ML includes a first portion ML1 extending in a substantially horizontal direction from the switching valve SV and a second portion ML2 that is provided in connection with the first portion ML1. The second portion ML2 is provided such that it descends from the end of the first portion ML1, and a main discharge port MLa is formed at its tip.

The sub discharge pipe SL includes a rising gradient portion SL1 that is formed to incline upwards from the switching valve SV, a horizontal portion SL2 that is provided in connection with the rising gradient portion SL1, and a falling gradient portion SL3 that is provided in connection with the horizontal portion SL2. The horizontal portion SL2 is provided so as to extend in a substantially horizontal direction from the end of the rising gradient portion SL1. The falling gradient portion SL3 is provided so as to incline downwards from the end of the horizontal portion SL2. Accordingly, the sub discharge pipe SL includes a rising gradient portion SL1 formed to incline upwards above the gradient of the main discharge pipe ML, and a falling gradient portion SL3 formed to incline downwards at the downstream of the rising gradient portion SL1. A sub discharge port SLa is formed at the tip of the falling gradient portion SL3.

The sub discharge port SLa of the sub discharge pipe SL is provided at a position higher than the main discharge port MLa of the main discharge pipe ML. As described above, since the sub discharge pipe SL includes a rising gradient portion SL1 formed to incline upwards above the gradient of the main discharge pipe ML, and a falling gradient portion SL3, the water that tries to enter from the sub discharge port SLa is not able to reach the rising gradient portion SL1 unless the water rises up the falling gradient portion SL3, thereby allowing the backflow of the water to be effectively controlled. Since the sub discharge port SLa is provided at a position higher than the main discharge port MLa, the water cannot enter the sub discharge port SLa unless the water rises up to a higher position, thereby allowing the backflow of the water to be effectively controlled.

Figure 3:
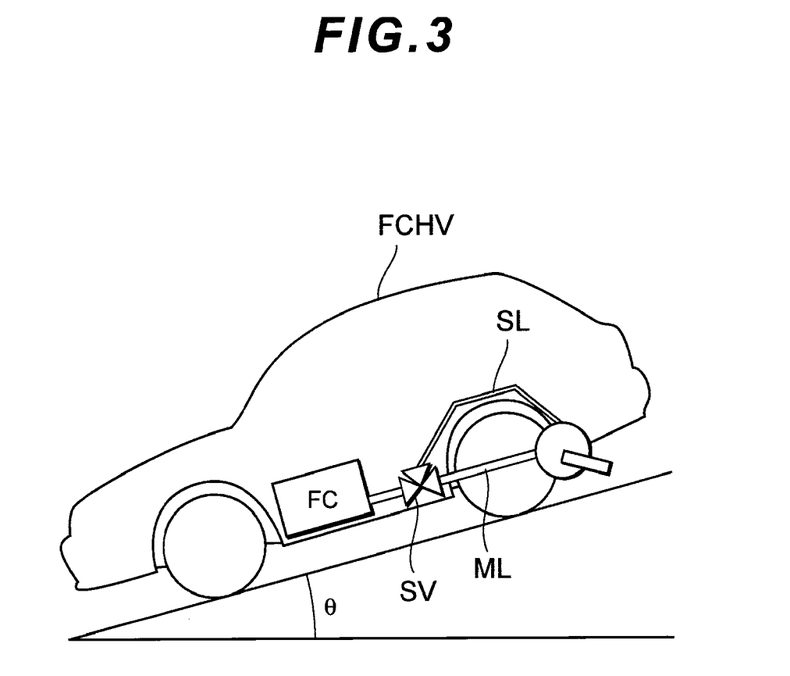
FIG. 3 is a diagram showing a configuration of a main discharge pipe and a sub discharge pipe that are mounted in a vehicle.

FIG. 3 shows a situation where such a fuel cell system FCS is mounted in the fuel cell hybrid vehicle FCHV. As shown in FIG. 3, when the fuel cell hybrid vehicle FCHV approaches a slope, the main discharge pipe ML and the sub discharge pipe SL have an inclination angle of A (corresponding to the inclination angle of the slope) in their extending directions (forward/backward direction of the fuel cell hybrid vehicle FCHV). In this case, for determining as to whether to use the main discharge pipe ML or the sub discharge pipe SL to discharge the off gas, it is preferable to consider the inclination angle $\theta$. In this way, the control which takes in consideration the inclination angle $\theta$ will be described below in detail.

Figure 4:
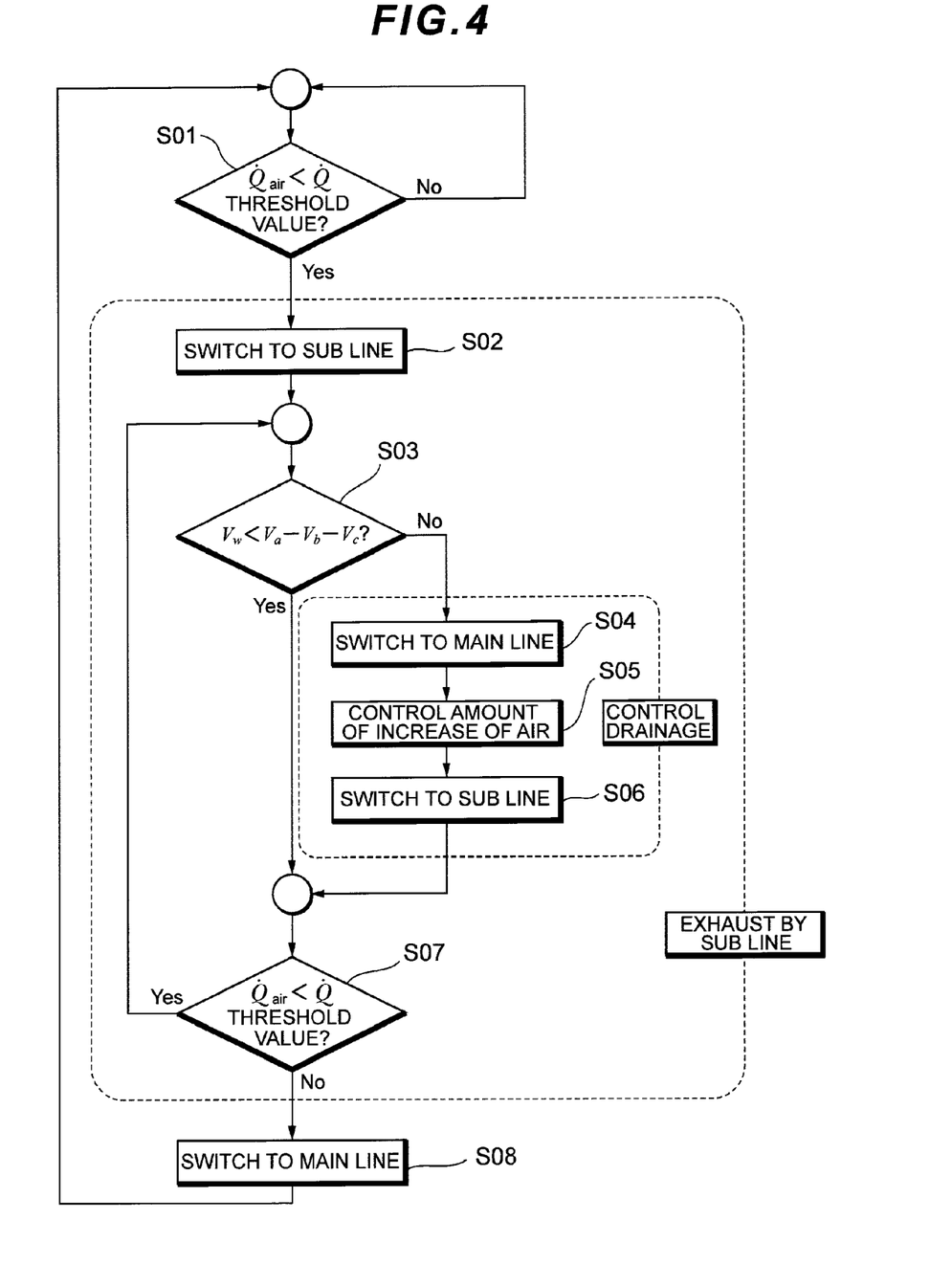
FIG. 4 is a flowchart showing a procedure of switching between the main discharge pipe and the sub discharge pipe.

Next, referring to FIG. 4, a control for switching the main discharge pipe ML and the sub discharge pipe S1 will be described. FIG. 4 is a flow chart showing the control for switching the main discharge pipe ML and the sub discharge pipe SL.

In step S01, the amount of reactant-off gas to be discharged $Q_{off}$ in the fuel cell FC is determined whether or not it is below the threshold value of the amount of discharge $Q_s$. The amount of reactant-off gas to be discharged $Q_{off}$ is calculated based on the discharge pressure of the oxidant-off gas of the fuel cell FC which is detected by a pressure sensor S6. Alternatively, the amount of reactant-off gas to be discharged $Q_{off}$ may be calculated based on the oxidant gas supply pressure by providing the pressure sensor S6 at the upstream of the fuel cell FC. It is also preferable to directly measure the amount of reactant-off gas to be discharged $Q_{off}$ by providing a flow rate sensor at the downstream of the diluter DL. In step S01, if the amount of reactant-off gas to be discharged $Q_{off}$ in the fuel cell FC is below the threshold value of the amount of discharge $Q_s$, the step proceeds to step S02, and if the amount of reactant-off gas to be discharged $Q_{off}$ is equal to or above the threshold value of the exhaust amount Qs, the determination in step S01 is repeated.

The threshold value of the amount of discharge $Q_s$ used in the determination in step S01 is calculated as shown in formula (4), taking into consideration the inclination of the fuel cell hybrid vehicle FCHV. In formula (4), a is the required amount of discharge when there is no inclination, b is the increase in the required amount of discharge due to the inclination effect (b=$b_0$ sin θ; θ is the inclination angle of the vehicle (see FIG. 3); and $b_0$ is the coefficient of the effect due to inclination), $T_0$ is the temperature while designing (map creation), and T is the temperature while controlling.

$$Qs=(a+b) \times T_0/T \qquad (4)$$

In step S02, the controller EC outputs a command signal to the switching valve SV and switches the discharge path from the main discharge pipe ML to the sub discharge pipe SL. In step S03 which continues from step S02, the amount of water $V_w$ that is pooled in the sub discharge pipe SL is taken into consideration to determine whether or not the $V_w$ would be equal to or above the threshold value $V_a$-$V_b$-$V_c$. $V_a$ is the amount of water that could be pooled in the sub discharge pipe SL when there is no inclination. $V_b$ is the increase in the amount of pooled water due to the inclination effect, and is calculated by formula (5). In formula (4), θ is the inclination angle of a vehicle (see FIG. 3), and $V_{b0}$ is the coefficient of the effect due to inclination.

$$V_b = V_{b0} \sin \theta \qquad (5)$$

$V_C$ is the correction coefficient for avoiding freezing caused by the temperature, and is calculated by formulas (6) and (7). In formula (7), β is the coefficient for avoiding freezing, $T_{FC}$ is the operating temperature of the fuel cell, and T is the outside-air temperature.

$$T \geq 273K(0° C.): V_c=0 \qquad (6)$$

$$T < 273K(0° C.): V_c=\beta(T_{FC}-T) \qquad (7)$$

When the amount of water $V_w$ that is pooled in the sub discharge pipe SL is equal to or above the threshold value $V_a$-$V_b$-$V_c$, the process proceeds to step S04, and when the amount of water $V_w$ that is pooled in the sub discharge pipe SL is smaller than the threshold value $V_a$-$V_b$-$V_c$, the process proceeds to step S07.

In step S04, the controller EC outputs a command signal to the switching valve SV and switches the discharge path from the sub discharge pipe SL to the main discharge pipe ML. In step S05 which continues from step S04, the controller EC performs an air increase control such that an increased amount of air is supplied to the fuel cell FC. As a result, the pooled water can be discharged to the outside by using the main discharge pipe ML without a rising gradient. In step S06 which continues from step S05, the controller EC outputs a command signal to the switching valve SV to switch the discharge path from the main discharge pipe ML to the sub discharge pipe SL. After the process in S06, the process proceeds to step S07.

In step S07, it is determined whether or not the amount of reactant-off gas to be discharged $Q_{off}$ in the fuel cell FC is below the threshold value of the amount of discharge $Q_s$. In step S07, if the amount of reactant-off gas to be discharged $Q_{off}$ in the fuel cell FC is below the threshold value of the amount of discharge $Q_s$, the process proceeds to step S03, and if the amount of reactant-off gas to be discharged $Q_{off}$ is equal to or above the threshold value of the amount of discharge $Q_s$, the process proceeds to step S08.

In step S08, the controller EC outputs a command signal to the switching valve SV and switches the discharge path from the sub discharge pipe SL to the main discharge pipe ML. After the process in step S08, the process returns to step S01.

In the above-mentioned process flow, the process from step S02 to step S07 is a process based on the act of exhausting the gas by the sub discharge pipe SL. In such processes, step S04 to step S06 temporarily exhaust the air by the main discharge pipe ML and increases the amount of air that is supplied to the fuel cell FC, thereby increasing the amount of off gas and controlling the drainage of the water in the main discharge pipe ML and the sub discharge pipe SL.

In the present embodiment described above, although an electromagnetic valve has been used as the switching valve SV, it is also preferable to use a mechanical valve as the switching valve SV. If the electromagnetic valve is used as the switching valve SV, it is possible to switch between the sub discharge pipe SL and the main discharge pipe ML with any flow rate as described above, and consider the inclination angle of the vehicle and the outside-air temperature. If the mechanical valve is used as the switching valve SV, such adjustment is difficult, but it is possible to switch between the sub discharge pipe SL and the main discharge pipe ML with an easy configuration. A configuration of a switching valve SVa for such a mechanical valve is shown in FIG. 5.

Figure 5:
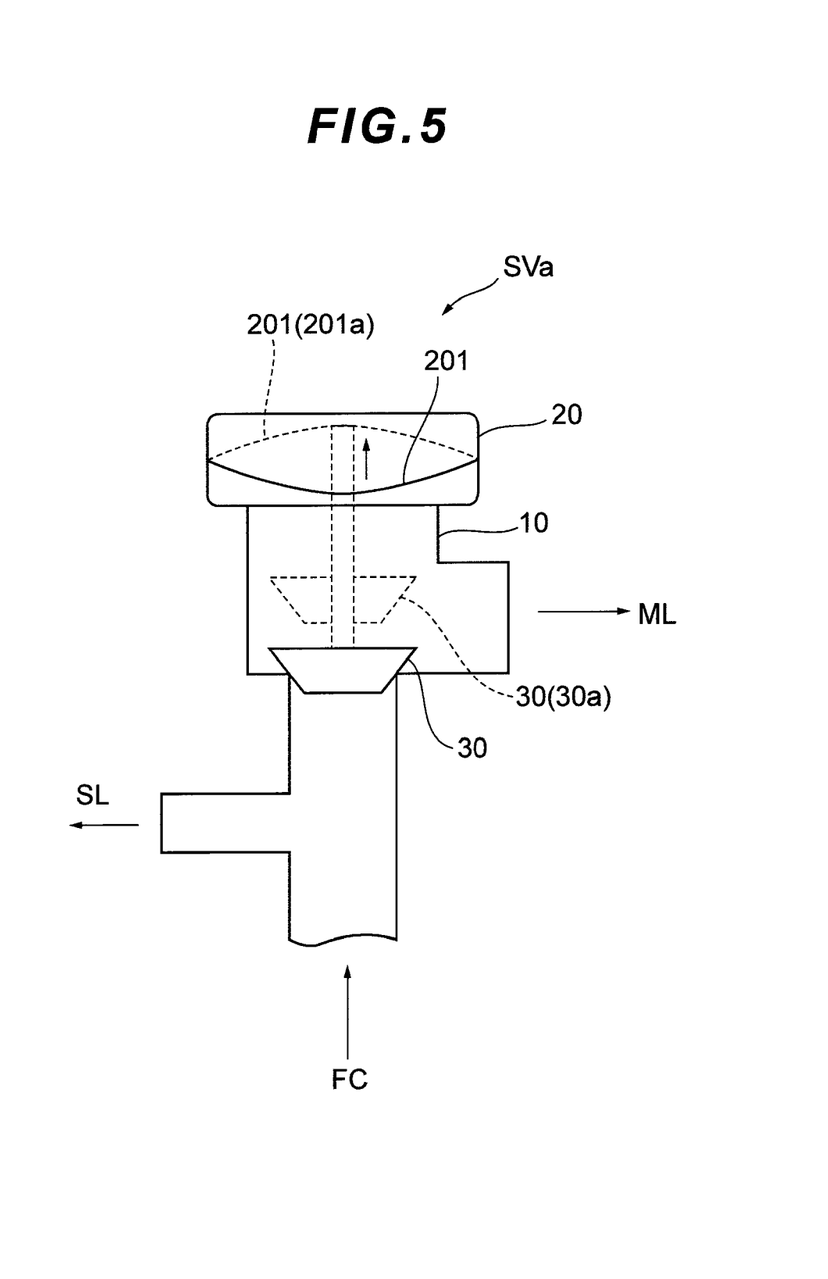
FIG. 5 is a diagram showing a modified example of a switching valve.

The switching valve SVa as shown in FIG. 5 includes a main body 10, a biasing section 20 and a valve body 30. A diaphragm 201 is positioned in the biasing section 20, and the diaphragm 201 biases the valve body 30 such that the inlet of the off gas delivered from the fuel cell FC is blocked. The off gas delivered from the fuel cell FC is configured to always be delivered to the sub discharge pipe SL side at the upstream of the switching valve SVa. When the flow rate of the off gas that is delivered from the fuel cell FC exceeds the predetermined value, the gas exceeds the limit for delivery to the sub discharge pipe SL and is pushed into the valve body 30. As a result, the valve body 30 moves to a position 30a, causing the diaphragm 201 to move to a position 201a such that the off gas is also delivered to the main discharge pipe ML.

DESCRIPTION OF REFERENCE NUMERALS

FCS . . . Fuel cell system; FC . . . Fuel cell; ASS . . . Oxidant gas supply system; AS1 . . . Filter; AS2 . . . Air compressor; AS3 . . . Oxidant gas flow path; AS4 . . . Oxidant-off gas flow path; AS5 . . . Humidifier; A3 . . . Backpressure regulating valve; CS . . . Cooling system; CS1 . . . Radiator; CS2 . . . Coolant pump; CS3 . . . Coolant forward path; CS4 . . . Coolant return path; FSS . . . Fuel gas supply system; FS1 . . . Fuel gas supply source; FS2 . . . Injector; FS3 . . . Fuel gas flow path; FS4 . . . Circulation flow path; FS5 . . . Circulation pump; FS6 . . . Exhaust/drain flow path; H1 . . . Cutoff valve; H2 . . . Regulator; H3 . . . Cutoff valve; H4 . . . Cutoff valve; H5 . . . Exhaust/drain flow path; ES . . . Electric power system; ES1 . . . DC/DC converter; ES2 . . . Battery; ES3 . . . Traction inverter; ES4 . . . Traction motor; ES5 . . . Auxiliary device; EC . . . Controller; S1 . . . Voltage sensor; S2 . . . Current sensor; S3 . . . SOC sensor; S4, S6: Pressure sensor; S5 . . . Water temperature sensor; S7 . . . FC temperature sensor; S8 . . . Outside-air temperature sensor; S9 . . . Inclination angle sensor; ACC . . . Accelerator open degree sensor; IG . . . Ignition signal; VC . . . Vehicle speed signal; ML . . . Main discharge pipe; ML1 . . . First portion; ML2 . . . Second portion; MLa ... Main discharge port; SL ... Sub discharge pipe; SL1 ... Rising gradient portion; SL2 ... Horizontal portion; SL3 ... Falling gradient portion; SLa ... Sub discharge port; SV ... Switching valve.

What is claimed is:

1. A fuel cell system comprising:
a fuel cell that is supplied with a reactant gas and generates electric power through an electrochemical reaction; and
an exhaust pipe that discharges a reactant-off gas discharged from the fuel cell,
wherein the exhaust pipe is configured to switch between a first exhaust pipe and a second exhaust pipe by means of a switching device to discharge the reactant-off gas,
wherein the first exhaust pipe and the second exhaust pipe are arranged in parallel,
wherein the second exhaust pipe includes a rising gradient portion formed to incline upwards above a gradient of the first exhaust pipe and a falling gradient portion formed to incline downwards at a downstream of the rising gradient portion,
wherein the switching device is programmed to switch to allow the reactant-off gas to be discharged from the first exhaust pipe if an amount of reactant-off gas to be discharged is equal to or above a predetermined threshold value of an amount of discharge, and further programmed to allow the reactant-off gas to be discharged from the second exhaust pipe if the amount of reactant-off gas to be discharged is below the predetermined threshold value of the amount of discharge, and
wherein the first exhaust pipe and the second exhaust pipe do not rejoin downstream of the switching device so as to prevent the reactant-off gas from the first exhaust pipe from entering the second exhaust pipe, and the reactant-off gas from the second exhaust pipe from entering the first exhaust pipe.

2. The fuel cell system according to claim 1, further comprising an inclination angle acquiring device that acquires an inclination angle in a direction which the exhaust pipe of a vehicle equipped with the fuel cell system extends,
wherein the switching device is programmed to adjust the threshold value of the amount of discharge by the inclination angle acquired by the inclination angle acquiring device, and switches between the first exhaust pipe and the second exhaust pipe depending on the predetermined threshold value of the amount of discharge after the adjustment.

3. The fuel cell system according to claim 1, wherein if an amount of water that is pooled in the exhaust pipe is equal to or above a predetermined threshold value of the amount of water, the switching device is programmed to switch so as to discharge the reactant-off gas from the first exhaust pipe.

* * * * *

UNITED STATES PATENT AND TRADEMARK OFFICE
CERTIFICATE OF CORRECTION

PATENT NO. : 8,652,699 B2  Page 1 of 1
APPLICATION NO. : 13/503241
DATED : February 18, 2014
INVENTOR(S) : K. Suematsu et al.

It is certified that error appears in the above-identified patent and that said Letters Patent is hereby corrected as shown below:

In the Specification:

At column 8, line 43, change "A" to -- $\theta$ --.

Signed and Sealed this
Twenty-sixth Day of August, 2014

Michelle K. Lee
*Deputy Director of the United States Patent and Trademark Office*